US011542924B2

United States Patent
Ramirez et al.

(10) Patent No.: US 11,542,924 B2
(45) Date of Patent: Jan. 3, 2023

(54) MULTI-SUBSTRATE NOISE MITIGATION SYSTEM FOR MONOPOLE TOWERS OF WIND TURBINE SYSTEMS

(71) Applicant: RWS, LLC, Lake Wells, FL (US)

(72) Inventors: Maurice A. Ramirez, Lake Wells, FL (US); Allison Sakara, Lake Wells, FL (US)

(73) Assignee: High Alert Institute, Inc., Lake Wales, FL (US)

( * ) Notice: Subject to any disclaimer, the term of this patent is extended or adjusted under 35 U.S.C. 154(b) by 90 days.

(21) Appl. No.: 16/994,922

(22) Filed: Aug. 17, 2020

(65) Prior Publication Data
US 2021/0048006 A1    Feb. 18, 2021

Related U.S. Application Data

(60) Provisional application No. 62/888,434, filed on Aug. 16, 2019.

(51) Int. Cl.
    *F03D 13/20*    (2016.01)
    *F03D 80/80*    (2016.01)
    *G10K 11/162*    (2006.01)

(52) U.S. Cl.
    CPC ............ *F03D 80/88* (2016.05); *G10K 11/162* (2013.01); *F05B 2260/301* (2013.01); *F05B 2260/964* (2013.01)

(58) Field of Classification Search
CPC .......... F03D 13/10; F03D 13/20; F03D 13/22; F03D 80/88; B63B 15/0083; B63B 2015/0091
See application file for complete search history.

(56) References Cited

U.S. PATENT DOCUMENTS

| | | | | |
|---|---|---|---|---|
| 7,144,216 B2* | 12/2006 | Hessel | .................... | F03D 80/00 415/909 |
| 7,296,977 B2* | 11/2007 | Bonnet | .................... | B32B 15/20 416/229 R |
| 10,294,924 B2* | 5/2019 | Altmikus | .................. | F03D 1/06 |
| 2009/0142178 A1* | 6/2009 | Nieuwenhuizen | ...... | F03D 13/22 415/2.1 |
| 2011/0239564 A1* | 10/2011 | Zheng | ..................... | E04H 12/02 52/231 |
| 2012/0107054 A1* | 5/2012 | Baumfalk | ............. | E02D 27/425 181/115 |
| 2016/0265514 A1* | 9/2016 | Cook | .................... | E02D 27/425 |
| 2020/0332770 A1* | 10/2020 | Gupta | ....................... | F03D 1/00 |

FOREIGN PATENT DOCUMENTS

GB      2022044 A    * 12/1979      ......... B63B 15/0083

* cited by examiner

*Primary Examiner* — Justin D Seabe
(74) *Attorney, Agent, or Firm* — Clayton, McKay & Bailey, PC (57) ABSTRACT

A wind turbine noise suppression system can include a sound absorbing batting and a fabric sheet within a column of the wind turbine. The sheet can hang within the column whereas the batting can be placed in at least a bottom and top region. A vibration isolation pad at the top of the column can mitigate a megaphone effect. The pad can be combined with an isolation washer. The pad can be less than a half inch thick, whereas the isolation washer can be less than a quarter inch thick. A sound curtain can be installed at a base of the column to suppress bell resonance. The system can, for example, reduce wind turbine noise up to ninety percent.

20 Claims, 5 Drawing Sheets

MULTI-SUBSTRATE NOISE MITIGATION SYSTEM FOR MONOPOLE TOWERS OF WIND TURBINE SYSTEMS

CROSS-REFERENCE TO RELATED APPLICATIONS

This non-provisional application claims priority to provisional application No. 62/888,434, titled "Multi-Substrate Noise Mitigation System for Monopole Towers of Wind Turbine Systems," filed Aug. 16, 2019, which is incorporated by reference in its entirety.

BACKGROUND

There is an increasing demand for land-based small, medium, and large wind turbine sites for single installation and wind farms. This demand has generally tracked the increase in demand for renewable energy sources. However, wind turbine adoption, particularly in small-scale residential settings, has been hindered by problems associated with noise production.

Wind turbines generate noise from multiple mechanical and aerodynamic sources. Although technology advances have led to quieter turbines, noise from wind turbines remains a public concern. The problems associated with wind turbine noise have been one of the more studied environmental impact areas in wind energy engineering. Noise levels can be measured, but the public's perception of the noise impact of wind turbines is in part a subjective determination. Noise is defined as any unwanted sound. Some factors for noise production can be mitigated by existing technology. Such factors include level of intensity of the noise source(s), frequency of the noise source(s), and frequency distribution and patterns of the noise source(s). Other noise factors cannot be easily mitigated. These can include background noise levels, the terrain between the emitter and receptor, and the nature of the noise receptor.

The effects of noise on people can be classified into three general categories (National Wind Coordinating Committee, 1998: subjective effects including annoyance, nuisance, dissatisfaction; interference with activities such as speech, sleep, and learning; and physiological effects such as anxiety, tinnitus, or hearing loss. Whether a noise is objectionable or not is a function of and varies with the type of noise: tonal, broadband, low frequency, or impulsive. The objectionable nature of the noise is also based on the circumstances and sensitivity of the person (or receptor) who hears it. Because of the wide variation in the levels of individual tolerance for noise, there is no completely satisfactory way to measure the subjective effects of noise or of the corresponding reactions of annoyance and dissatisfaction.

Wind turbines are often sited in rural or remote areas that have a corresponding ambient noise character. Furthermore, while noise may be a concern to the public living near wind turbines, much of the noise emitted from the turbines is masked by ambient or the background noise of the wind itself. At the present time, the noise produced by wind turbines has diminished as the technology has improved. As blade airfoils have become more efficient, more of the wind energy is converted into rotational energy, and less into acoustic noise. Vibration damping and improved mechanical design have also significantly reduced noise from mechanical sources. Despite these advancements, wind industry and acoustic engineering studies have found that wind turbines typically produce sound levels of 95 dBA to 107 dBA measured 1 ft from the turbine source.

Given that noise is a primary obstacle for gaining broad public acceptance, the accurate noise assessment of wind turbines is a necessity. Accurate predictions require not only the knowledge of the noise sources and sound levels from each source levels, but a realistic, targeted approach to the suppression, mitigation, and dampening of these multimodal noise sources. Given the spectrum of frequencies that contribute to the overall noise of wind turbine installations, multiple noise suppression, mitigation and dampening material substrates are required to decrease the sound levels for near and far field noise perceived by ground level observers.

The classical approach for wind turbine system noise predictions assumes an overall source power level for a wind turbine and uses a propagation relationship based on hemispherical spreading. The rule of thumb for wind turbine noise planning assumes that the sound level for wind turbine noise will decrease by 6 dBA each time the distance from the turbine doubles. Even though this approach neglects many physical processes, it has been the standard for some years. Current wind turbine certification standards include a calculate sound level based on the sound pressure level (dBA) not exceeded by the wind turbine 95% of the time at a distance of 60 meters from the rotor with an average wind speed of 5 m/s (11.2 mph). Given the typical wind turbine sound level at 1 ft from the turbine source, the sound meter at 60 meters is calculated to be 95 dBA to 107 dBA which is consistent with field observations.

Design changes intended to mitigate the impact of wind turbine installations on wildlife and visual aesthetics have yielded the increasing adoption of monopole towers by industry and government regulators. The introduction of monopole tower has inadvertently increased vibrational noise and resonant amplification of noise from the turbine.

Noise sources of monopole wind turbine systems include:
Turbine Mechanical Vibration
Turbine Electrical Vibration
Tower Reed Effect
Tower/Wind Turbulence
Blade/Tower Turbulence
Blade/Rotor Turbulence These noise sources share overlapping acoustical effects that propagate and amplify turbine and tower noise, as shown in Table 1 below.

TABLE 1

| Multi-Modal Noise Sources and Multi-Modal Resonant Amplification | Tower Open Air Column Resonance | Tower Megaphone Effect | Tower Structural Sound Propagation | Tower Conical Resonance | Tower Bell Resonance | Cable Resonance |
|---|---|---|---|---|---|---|
| Turbine Mechanical Vibration | X | X | X | X | X | X |
| Turbine Electrical Vibration | X | X | X | X | X | X |
| Tower Reed Effect | X | | X | X | X | X |

TABLE 1-continued

| Multi-Modal Noise Sources and Multi-Modal Resonant Amplification | Tower Open Air Column Resonance | Tower Megaphone Effect | Tower Structural Sound Propagation | Tower Conical Resonance | Tower Bell Resonance | Cable Resonance |
|---|---|---|---|---|---|---|
| Tower/Wind Turbulence | X | | X | X | X | |
| Blade/Tower Turbulence | X | | X | X | X | |
| Blade/Rotor Turbulence | X | | X | X | X | |

Wind turbines have multiple mechanical and structural sources of noise and vibration. Turbine mechanical noise contributes primarily low and medium frequency noise. While this noise is audible at ground level by air transmission, the lower frequencies are particularly well amplified by the column resonance of the monopole tower. Turbine electrical noise contributes primarily very low and low frequency noise This is transmitted primarily to ground level by material transmission through the turbine body and tower.

Wind passing across an opening at the top of the tower or along the tower wall introduces resonant (reed-effect) noise to the interior of the monopole. The frequency of this resonant noise is defined by the diameter, height and shape of the interior of the monopole as well as the size and shape of the opening across which the wind blows. This resonant noise transmitted to ground level by the tower.

Wind turbulence around the tower vibrates the tower wall, introducing resonant noise to the wall of the monopole. This vibrational noise is typically infrasonic or very low frequency and transmitted to ground level by the tower.

Blade rotation sets up structural vibration in the tower wall as each blade passes between the oncoming wind and the tower. The wind striking the tower wall between the blades produces a very low or low frequency vibration that is transmitted into the tower cavity by structural propagation and undergoes resonant amplification.

Blade shape and size result in the medium and high frequency noise commonly referred to as blade whoosh and blade whistle. This noise is primarily transmitted to ground level through the air, but some blade noise is transmitted into the turbine body and tower by solid material transmission.

The problem of resonant and vibrational noise with monopole towers is complicated by the conical shape of the monopole interior. The tapering design of most wind turbine monopoles provides structural stability and weight savings, but the conical shape also provides for column resonance across a wide and continuous spectrum of sound frequencies from infrasound to high frequency based on the internal diameter of the monopole and the length of the interior column space. Further, the hollow cone provides for bell resonance, transmission and amplification of vibrations introduced at the top of the monopole by the turbine.

Systems for mitigating sound resonance for wind turbines are needed, particularly for small-scale wind turbines.

SUMMARY

Examples below include a system for multi-substrate noise mitigation, abatement, and suppression in small scale wind turbines. The system can be installed on an existing wind turbine or built into a wind turbine. The system can block a combination of frequency ranges to achieve greater noise reduction than available currently for wind turbines.

The system can include hydrophobic sound absorbing fiber batting. In one example, hydrophobic sound absorbing fiber batting can be placed at the top, bottom and segmentally along the interior of the monopole. This can mitigate both conical and column resonance by suppressing noise transmission vertically in the monopole interior. Further, the segmental placement of batting can divide the monopole interior into distinct and separate frequency ranges for resonance based on the segmental diameter and length thus further reducing overall resonance and amplification within the monopole tower.

The system can also include impregnating the monopole of the turbine with a fabric sound absorbing sheet to dampen column (e.g., conical) resonance. This can mitigate and suppress column and conical resonance both transaxially and longitudinally across the interior of the monopole tower. Hanging impregnated fabric vertically within the interior of the monopole can mitigate and suppress both conical and column resonance within the monopole. This can also suppress the resonant amplification of any vibrational noise introduced by the wall of the monopole itself.

The sheet can be in the form of a sail. The sail can be between about ⅛ to ¼ inches thick, in an example. The height of the tower also impacts the weight. For example, a 90-foot tall sail can weigh 168 pounds. The sail can include a twist to catch sound from any angle.

The system can further include adding hydrophobic sound absorbing batting to the inside of the column to dampen column resonance. This can mitigate air transmission of sound out of opening at the tower base or along the tower walls. This can include adding vibration isolation pads and mounts. The pad can be based on the weight of the top device (e.g., nacelle or monopole), such on how many pounds per square inch the top device is exerting. The pad can be between a quarter and half an inch thick. Isolation washers can be an eighth and a quarter inch thick. These ranges are approximate. The pads or isolation washers can isolate the base from the top of the tower. Isolation washers, for example, can be screwed between the base and top of the tower. Isolating the base from the top of the wind turbine can decrease the amount of noise transmitted to the ground or ground level.

The system can include hydrophobic fiber, six to twelve inches thick, spanning the width of the tower. The fiber can occlude the width of the tower so sound cannot freely pass.

The system can also include a skirt made of rubber at the base of the tower. The skirt can be one half to three quarters of an inch thick. The skirt can close this area.

These five techniques can be applied in combination, in an example. Doing so can achieve up to 90% sound suppression, in an example.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, a wind turbine with a monopole can have a reduced noise output. The system to mitigate noise can include a sound absorbing fiber batting in the interior of a monopole of the wind turbine. A fabric sheet can also hang within the monopole and can include at least one turn. The monopole can be isolated from the base and the nacelle using pads and isolation washers, in an example. A rubber skirt can also be placed around the base of the wind turbine. Together, these system elements can mitigate noise by reducing column or conical resonance, megaphone effect, blade turbulence bell resonance, cable resonance, and transaxial resonance. This can reduce ground level noise, in an example.

Mitigation and suppression of multi-modal transmission and amplification of turbine and tower noise requires a multi-modal approach using multiple substrates, each targeting a specific means of transmission and/or amplification as well as a specific range of sound frequencies. The suppression materials must be durable to withstand the forces exerted on a wind turbine and monopole tower system as well as suited to the temperature, humidity and moisture extremes commonly experiences by wind turbine and monopole tower systems.

Substrates to mitigate, abate and suppress these multi-modal mechanisms for noise amplification include those of Table 2, below.

Owing to the multi-modal origin of wind turbine noise, reduction of noise must include migration and suppression of noise using multiple substrates and approaches in combination.

Figure 1:
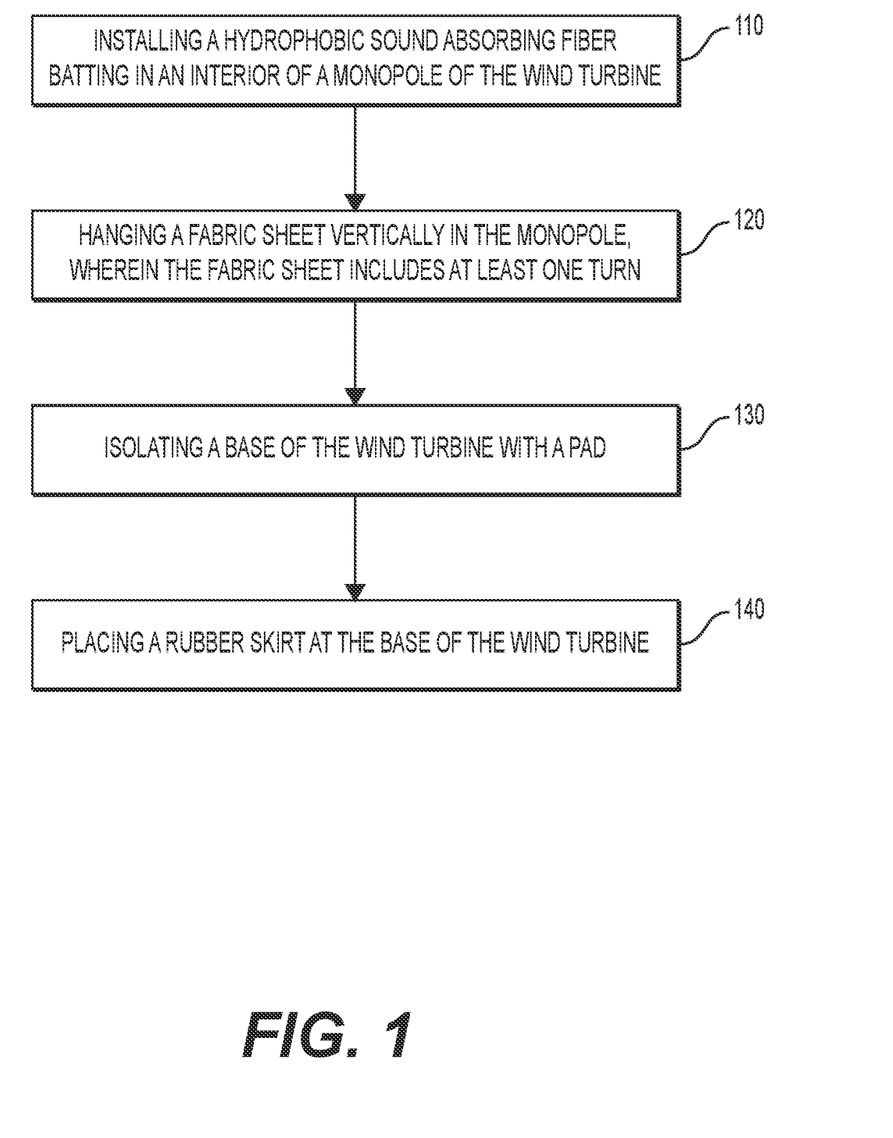
FIG. 1 is an example flowchart for installing a sound mitigation system in a wind turbine.

FIG. 1 is an example flowchart for equipping a wind turbine with the system. At stage 110, a hydrophobic sound absorbing fiber batting can be installed in an interior of a monopole of the wind turbine. In one example, this can be done as part of the assembly of the monopole. Alternatively, the monopole can be retrofitted.

The hydrophobic sound absorbing fiber batting can be placed at multiple locations within the monopole. For example, the batting can be placed at the top of the interior of the monopole, the bottom of the interior of the monopole, and in the middle of the monopole.

The hydrophobic sound absorbing fiber batting can be used to mitigate air transmission of sound as well as sound resonance across a wide noise range from infrasonic to high frequency. The hydrophobic sound absorbing fiber can provide sound mitigation benefits of felt and fiberglass batting without the concerns of moisture retention, mold, mildew, rust, wet rot, or infestation by rodents or insects. Hydrophobic sound absorbing fiber batting can reduce noise transmission by up to 90%. While installation in an inhabited structure requires that all voids be filled with batting, placing hydrophobic sound absorbing fiber batting at the top, bottom and segmentally along the interior of the monopole mitigates both conical and column resonance by suppressing noise transmission vertically in the monopole interior. Further, the segmental placement of batting divides the monopole interior into distinct and separate frequency ranges for resonance based on the segmental diameter and length thus further reducing overall resonance and amplification within the monopole tower.

At stage 120, a fabric sheet can be hung vertically in the monopole. The fabric sheet can be attached both at a top and bottom of the fabric sheet. In addition, the fabric sheet can include at least one twist to ensure that sound cannot travel unimpeded from the top to the bottom of the monopole interior.

In one example, impregnated fabric sound absorption sheeting is used to mitigate and suppress column and conical resonance both transaxially and longitudinally across the interior of the monopole tower. Known as "acoustical fencing," impregnated fabric sound absorption sheeting is a COTS technology employed around urban construction sites, tractor trailer loading docks and factories to mitigate the intrusion of low and medium frequency noise onto neighboring properties. Impregnated fabric sound absorption sheeting can be effective for very low, low and medium frequency noise, reducing sound transmission by up to 90%.

TABLE 2

| Multi-Modal Resonant Amplification and Multi-Substrate Noise Abatement | Tower Open Air Column Resonance | Tower Megaphone Effect | Tower Structural Sound Propagation | Tower Conical Resonance | Tower Bell Resonance | Cable Resonance |
|---|---|---|---|---|---|---|
| Vibration Isolation Pad & Mounts | X | X | X | X | X | |
| Hydrophobic Sound Batting | X | X | | X | X | X |
| Impregnated Fabric Sound Barrier | X | X | | X | X | X |
| Dense Resilient Sound Curtain | X | X | | X | X | X |

The ability to hang impregnated fabric vertically within the interior of the monopole can allow the mitigation and suppression of both conical and column resonance within the monopole as well as suppressing the resonant amplification of any vibrational noise introduced by the wall of the monopole itself.

At stage 130, at least one isolation pad can be installed to suppress transmission of vibrations from the turbine body into the monopole tower. The nacelle of the wind turbine can be isolated from a base of the wind turbine by installing a pad at the top and/or bottom of the monopole, in an example. The base can also be screwed to the monopole through isolation washers that similarly mitigate vibration transmission. The isolation pad can be located between a base of the wind turbine and at least one of the monopole and a nacelle. For example, the isolation pad can be placed between a base of the wind turbine and the monopole. Alternatively or additionally, the isolation pad can be placed between the top of the monopole and the nacelle.

Vibration suppression pads and mounts can be used to mitigate and suppress the solid material transmission of vibrational and resonant noise from the turbine body, gearbox, blades, and electrical components to the monopole tower. These pads and mounts can be common off-the-shelf (COTS) technology used commonly in light and heavy manufacturing to reduce both environmental noise and structural fatigue in factories, print houses and many other facilities. The combination of vibration suppression pad and mounts have demonstrated up to 90% reduction of vibrational noise transmission within the targeted frequency range for the vibration suppression pad. This technology is not commonplace for monopole installations. This is due, in part, to the fact that vibration isolation pad and mounts suppress vibrational noise within a limited frequency range. Like all noise suppression modalities, the vibration suppression pad and mounts must be matched to the noise to be suppressed. For rooftop and building mounted installations, this is typically low frequency noise as the building itself mitigates the higher frequency noise.

At stage 140, a dense resilient sound curtain can be installed at the base of the wind turbine. This can also be referred to as a skirt or a mat. This can help reduce bell resonance. The rubber skirt can wrap around the base a location where the monopole meets the base, in an example.

In one example, the dense resilient sound absorbing curtain (which can include a mat) is used to mitigate air transmission of sound out of opening at the tower base or along the tower walls. This COTS technology can be used to mitigate sound transmission through permanent openings in manufacturing equipment and through passageways of high noise structures. Dense resilient sound absorbing mats mitigate and suppress noise transmission across a wide noise range from infrasonic to high frequency with up to 60% reduction. The dense resilient sound absorbing mats can be a quarter inch to one-inch thick rubber, butyl, leather or other sound deadening material hung or secured across an air gap opening.

Each of these multiple substrates provide noise mitigate, abatement and suppression to several of the sources of noise providing a multi-substrate approach to this multi-modal problem, as shown in Table 3 below.

TABLE 3

| Multi-Modal Noise Sources and Multi-Substrate Noise Abatement | Vibration Isolation Pad & Mounts | Hydrophobic Sound Batting | Impregnated Fabric Sound Barrier | Dense Resilient Sound Curtain |
|---|---|---|---|---|
| Turbine Mechanical Vibration | X | X | X | X |
| Turbine Electrical Vibration | X | X | X | X |
| Tower Reed Effect | | X | X | X |
| Tower/Wind Turbulence | | X | X | X |
| Blade/Tower Turbulence | | X | X | X |
| Blade/Rotor Turbulence | | X | X | X |

While reduction in overall sound level an important effect of this multi-substrate approach to multi-modal noise sources, it is equally important to reduce of wind turbine noise annoyance, nuisance and dissatisfaction. The strategic placement of each mitigation technology not only reduces noise transmission and resonant amplification, but also changes the spectrum of frequencies contributing to the overall wind turbine noise.

Figure 2:
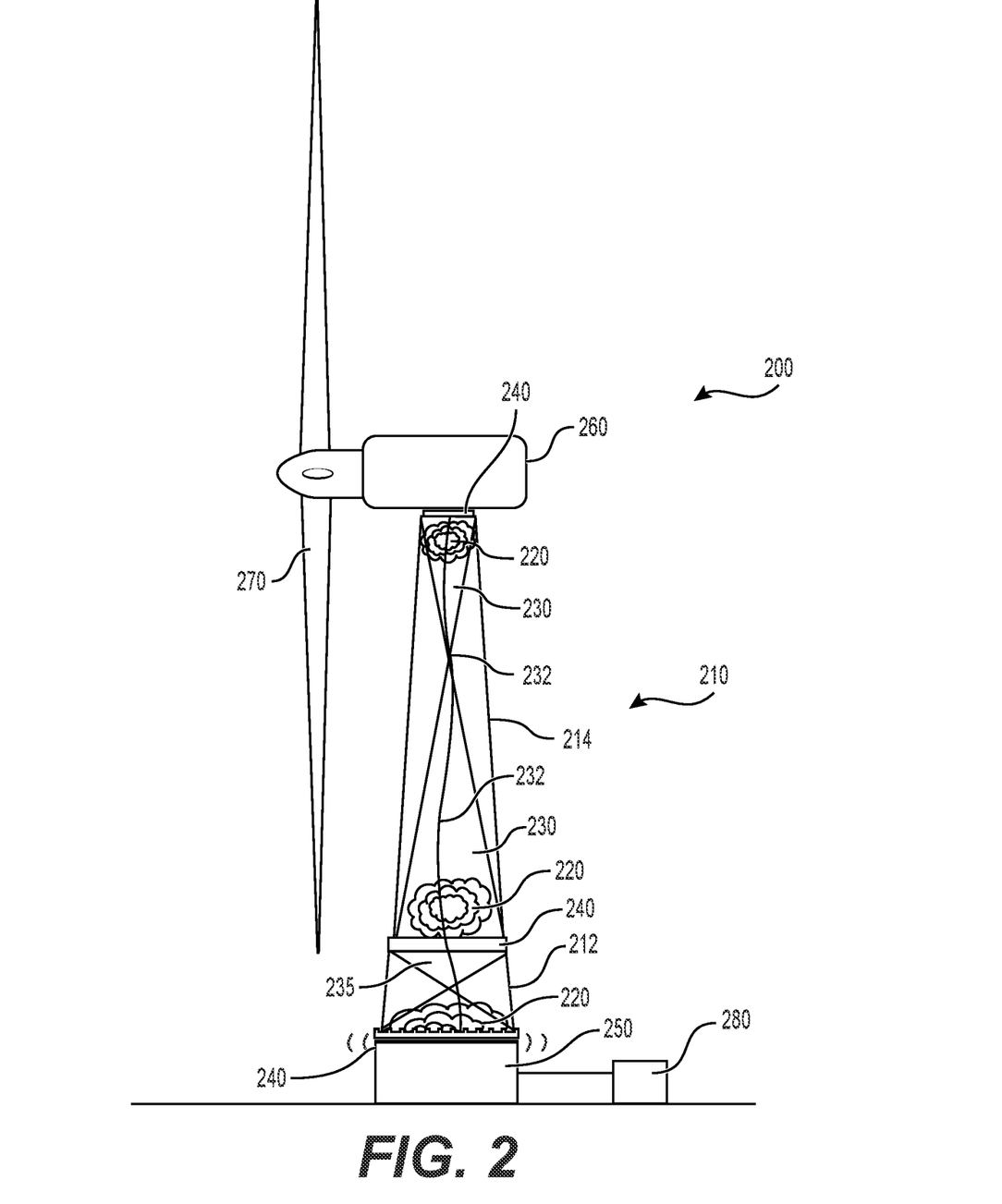
FIG. 2 is an example illustration of a wind turbine that includes a sound mitigation system.

FIG. 2 is an example illustration of a wind turbine 200 equipped with a sound reduction system. The wind turbine 200 can include a nacelle 260, a monopole 210, and a base (such as beneath skirt 250). The monopole 210 can be mounted to the base and the nacelle 260. The monopole 210 can have a hollow interior that includes at least a hydrophobic sound absorbing fiber batting 220 and a fabric sheet 230 hung vertically in the monopole. The fabric sheet 230 can include at least one turn. The wind turbine 240 can also include an isolation pad 240 located between the monopole 210 and nacelle 260, and a skirt 250 wrapped around the base.

The nacelle 260 can house a gearbox, generator, and other components for controlling and creating electricity from the spinning of blades 270. These components can cause vibrations and noise that can be amplified and transmitted by the monopole 210, in an example.

The monopole 210 can include hydrophobic sound absorbing batting 220 at multiple locations, in an example. The batting 220 can be a fibrous material. As shown in FIG. 2, the batting 220 can be placed at the bottom, middle, and top of the monopole 210. The hydrophobic sound absorbing batting 220 can be positioned segmentally along the interior of the monopole 210 in a way that divides the monopole 210 interior according to different frequency ranges. For example, the distance between the bottom and middle batting 220 can be different than the distance between the middle and top batting 220. This can ensure that no one wavelength of sound can resonate with end points that fall at both of those distances.

Hydrophobic sound absorbing fiber batting 220 can be placed at intervals across the diameter of the tower cavity to absorb resonant waves propagating in the tower cavity converting open column resonance to closed column resonance. The change to closed column resonance can reduce the resonant amplification while narrowing the range of resonant frequencies. The intermittent placement can also divide the cavity into sub-cavities of unequal length thus narrowing the range of resonant frequencies within the tower cavity. The unequal cavity lengths also can increase interference waves that suppress structural propagation of sound from one tower segment to the next. The presence of sound absorbing fiber batting 220 at the ends of each tower cavity segment suppresses resonance and transmission of noise within the cavity and suppresses bell resonance by closing the open ends of the tower. Finally, the batting 220 dampens vibration in the cable(s) 232 passing through the cavity of the tower, suppressing cable resonance and cable mediated noise transmission.

Additionally, one or more fabric sheets 230, 235 can be hung within the monopole 210. The fabric sheet 230, 235 can have a thickness within a range of one-eighth of an inch to one-fourth of an inch.

The fabric sheets 230, 235 are each shown with one twist, but additional twists are also possible. In this example, the monopole 210 includes a top section 214 and a bottom section 212. Each section 214, 212 can have its own fabric sheet 230, 235, respectively, in an example. Impregnated fabric sound absorption sheeting 230 can be placed longitudinally in the tower cavity. The material can be installed with a 90 to 180-degree twist around the long axis of each segment. This installation provides 360 degrees of trans-axial sound absorption for resonant waves traveling across the diameter of the tower cavity. The impregnated fabric sheeting 230, 235 can also unequally divide the width of the cavity narrowing the range of resonant frequencies across the tower cavity and increasing interference waves that suppress structural propagation of sound within the tower walls.

The sections can be isolated from the nacelle 260 using pads 240, in an example. For example, a pad 240 is shown as installed between the top of the top section 214 and the nacelle 260. Another pad 240 can be installed between the first and second sections 214, 212. Still another pad 240 can be installed between the monopole 210 and a base of the wind turbine 200 (e.g., where the monopole 210 is anchored to the ground).

Vibration suppression pads and mounts can be placed between the wind turbine mounting plate and the top of the tower to suppress structural transmission of vibration across the wind turbine noise spectrum, interrupting the establishment of resonant waves in the tower cavity and in the tower walls.

A curtain 250 can be installed around the base such that remaining noise does not escape unimpeded from the bottom of the monopole 210, such as where the monopole 210 is attached to the base. Cables 232 can extend down from the nacelle 260, through the monopole 210, and out to an output 280, such as a generator or power supply.

The curtain 250 can be a dense resilient sound absorbing mat in one example. The mat can be placed in and around the leveling gap at the base of the tower. The mat can close the open end of the tower converting open column resonance to closed column resonance. The change to closed column resonance reduces the resonant amplification while narrowing the range of resonant frequencies. The presence of mat at the leveling gap suppresses transmission of noise out of the tower cavity and suppresses bell resonance.

The National Renewable Energy Laboratory (NREL) for the US Department of Energy has published a "typical" Wind Turbine Noise source model consistent with NREL noise testing for small, medium and large wind turbines. This model is based on a 50 dBA sound level rating at a distance of 60 meters form the turbine rotor at 5 m/s for 95% of the turbine activity. The Wind and Renewable Energy Testing Facility at the University of Colorado at Boulder has extrapolated multi-modal models for wind turbine noise to include tower noise and resonance. Based on the NREL 60m 50 dBA standard, a wind turbine on a 30-meter conical monopole 210 would be expected to produce the following noise sound levels at one foot, 30 meters, and 60 meters, as shown in Table 4, below.

TABLE 4

| Sound Level Estimates Based on Multi-Modal Noise Sources with Resonant Amplification | 1' Sound Level dBA | 30 m Sound Level dBA | 60 m Sound Level dBA | Tower Base Sound Level with Resonant Amplification | 30 m Sound Level with Resonant Amplification | 60 m Sound Level with Resonant Amplification |
|---|---|---|---|---|---|---|
| Turbine Mechanical Vibration | 95 | 59 | 53 | 102.8 | 66.8 | 60.8 |
| Turbine Electrical Vibration | 95 | 59 | 53 | 102.8 | 66.8 | 60.8 |
| Tower Reed Effect | 80 | 44 | 38 | 87 | 51 | 45 |
| Tower/Wind Turbulence | 94 | 58 | 52 | 100 | 64 | 58 |
| Blade/Tower Turbulence | 94 | 58 | 52 | 100 | 64 | 58 |
| Blade/Rotor Turbulence | 94 | 58 | 52 | 100 | 64 | 58 |
| Turbine & Tower Combined | 101.4 | 65.4 | 59.4 | 108.4 | 72.4 | 66.4 |

Applying targeted noise mitigation to the multi-modal noise sources as described herein, a typical wind turbine on a conical monopole yields projected post-mitigation sound levels of at one foot, 30 meters, and 60 meters, as shown in Table 5, below.

TABLE 5

| Sound Level Estimates Based on Multi-Substrate Noise Abatement | 1' Sound Level dBA | 30 m Sound Level dBA | 60 m Sound Level dBA | Tower Base Sound Level with Noise Abatement | 30 m Sound Level with Noise Abatement | 60 m Sound Level with Noise Abatement |
|---|---|---|---|---|---|---|
| Turbine Mechanical Vibration | 95 | 59 | 53 | 61 | 25 | 19 |
| Turbine Electrical Vibration | 95 | 59 | 53 | 61 | 25 | 19 |
| Tower Reed Effect | 80 | 44 | 38 | 56 | 20 | 14 |
| Tower/Wind Turbulence | 94 | 58 | 52 | 70 | 34 | 28 |
| Blade/Tower Turbulence | 94 | 58 | 52 | 70 | 34 | 28 |
| Blade/Rotor Turbulence | 94 | 58 | 52 | 70 | 34 | 28 |
| Turbine & Tower Combined | 101.4 | 65.4 | 59.4 | 75.2 | 39.2 | 33.2 |

Figure 3A:
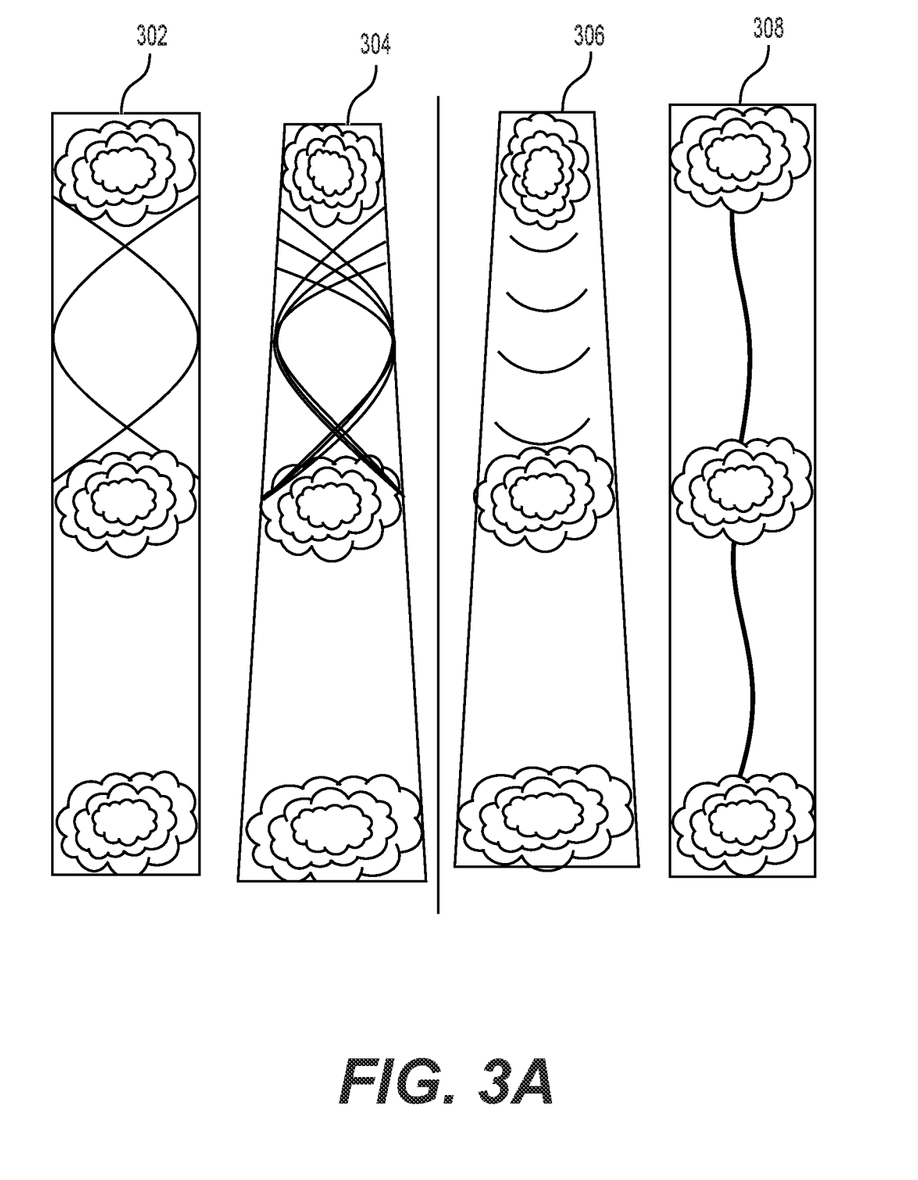
FIG. 3A is an example illustration of noise mitigation using batting.
Figure 3B:
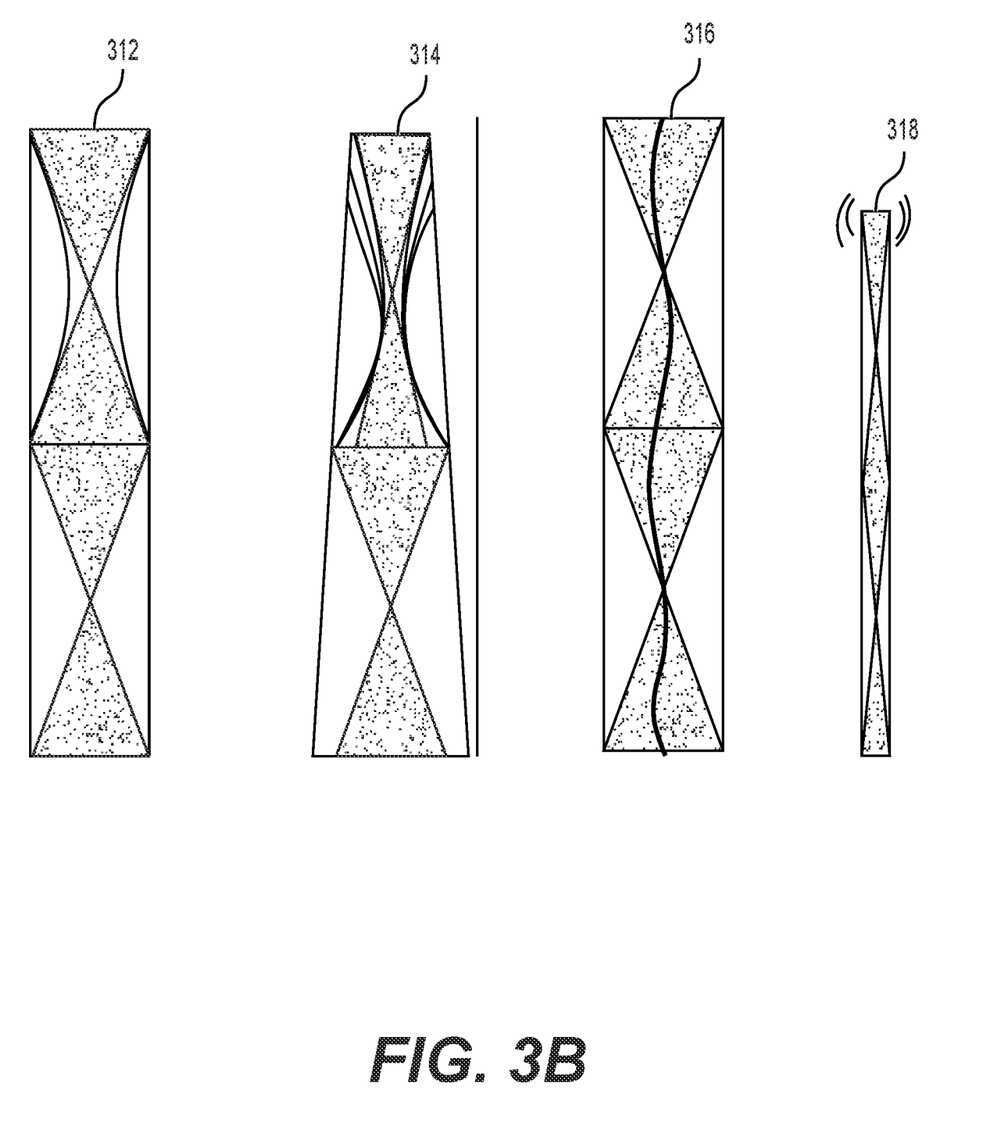
FIG. 3B is an example illustration of noise mitigation using a sheet.
Figure 3C:
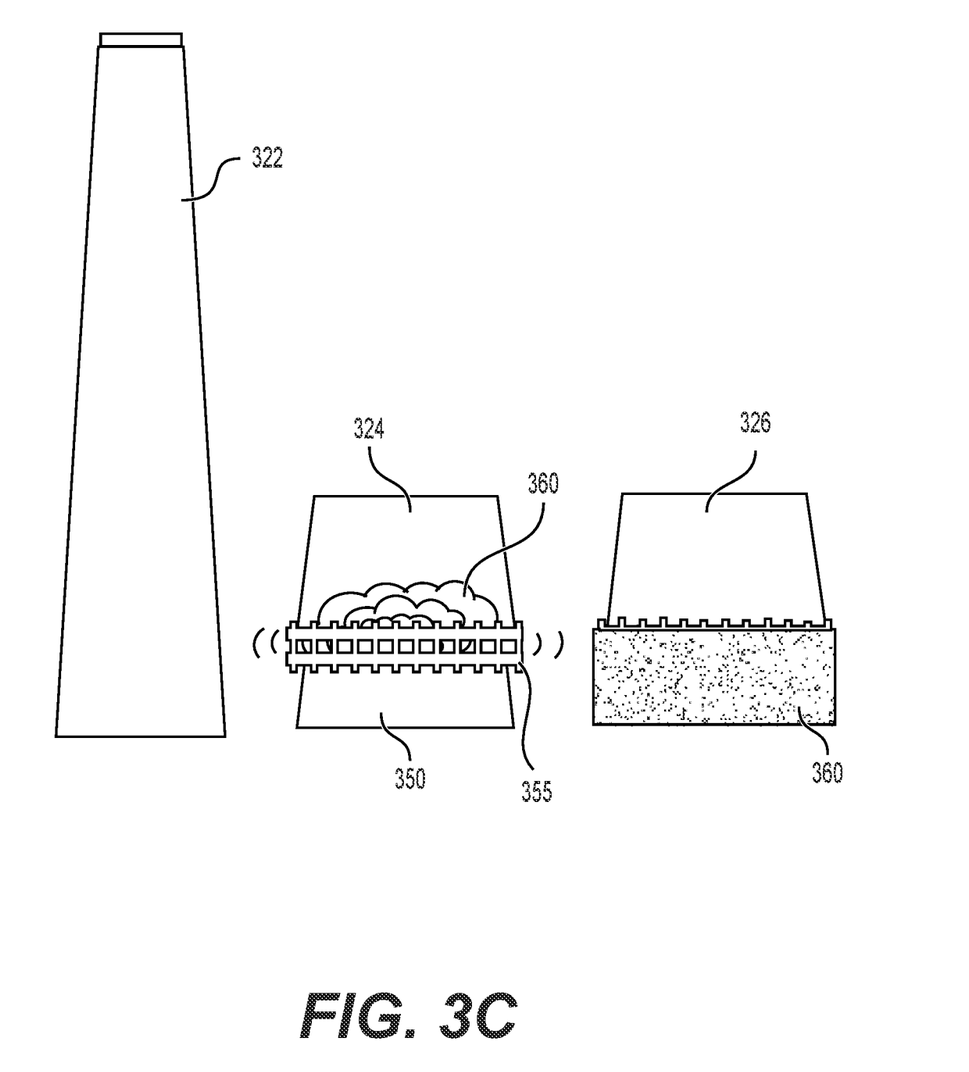
FIG. 3C is an example illustration of noise mitigation using isolation and absorptive elements at mount locations.

FIGS. 3A-3C break down these noise suppression techniques individually for further clarity. However, as described, the techniques of FIGS. 3A-3C are meant to be combined, such as shown in FIG. 2, to form effective noise suppression for wind turbines.

FIG. 3A is an example illustration of noise mitigation using batting. As shown in monopole 302, the batting can be placed at three locations to dampen column resonance. The batting can also dampen resonance caused by cables in the interior of the monopole, such as shown for monopole 308.

Similar techniques can be used for conical monopole interiors. For example, monopole 204 shows batting used to dampen conical resonance. In addition, a conical interior can produce a megaphone effect. Monopole 306 shows how the batting can mitigate the megaphone effect.

As mentioned previously, the hydrophobic sound absorbing fiber can be positioned segmentally along the interior of the monopole to divide the monopole interior according to different frequency ranges. This can ensure that all frequency ranges are intercepted and that no one wavelength can resonate between all of the different batting placements.

FIG. 3B is an example illustration of noise mitigation using a sheet. In monopole 312, column resonance can be damped by impregnating the monopole 312 with a fabric sound absorbent sheet. The triangles can represent a twist within the monopole 312. Again, the sheet can also help dampen cable resonance, as shown for monopole 316. Similar concepts can also apply to a conical interior. For example, monopole 314 shows conical resonance being dampened by the sound absorbent sheets.

In addition, monopole 318 illustrates how one or more sheets can be used to dampen noise from wind or tower turbulence. In effect, the sheet can act as a vibration damper.

The sheet can be a sail with a thickness within a range of one-eighth of an inch to one-fourth of an inch. Multiple such sails can be installed in a single monopole. Each sail can have at least one twist between a top and bottom of the sail.

FIG. 3C is an example illustration of additional noise mitigation using isolation and absorptive elements at mount locations. For example, monopole 322 shows how a pad can be placed at the top of the monopole 322 for purposes of mitigating the megaphone effect. In particular, the monopole 322 can be isolated from vibrations originating at the nacelle. This causes less noise to be amplified with the megaphone effect, causing less noise to arrive at the base.

A bottom portion of monopole 324 is shown connected to a base 350. The connection points 355 can include isolation washers to dampen vibrations transmitted through bolts, in an example. Additionally, batting 360 can be placed inside the connection 355 at the lower open end of the monopole 324 interior. This can help suppress bell resonance that otherwise could escape from the bottom of the monopole 324. Further, a skirt 360 can be placed around the base 350 to further dampen these noises, as shown for monopole 326. The skirt 360 can be a rubber mat, in an example.

The wind turbines and noise mitigation systems disclosed herein can have additional health benefits as well. Social Determinants of Health (SDoH) refer to the non-medical factors that impact overall health. These factors are at the center of a host of policies and initiatives by government agencies, health systems, and even the commercial sector. According to a landmark 2018 report from the World Health Organization (WHO), the leading Social Determinants of Health (SDoH) are noise pollution, poor air quality, and poor water quality, all of which have a strong link to a person's health and well-being. Ultimately, addressing SDoH is about employing new sources of data and technologies to look beyond traditional care models in support of a comprehensive health strategy.

The growing list of SDoH-related programs is diverse in approach and size. However, a consistent theme is healthcare leaders' growing recognition that in order to deliver better health outcomes, social determinants must be addressed. Moreover, the relationship between healthcare outcomes and SDoH factors must be definitively determined. Experts in SDoH research are now leveraging artificial intelligence/machine learning (AI/ML) to demonstrate these associations, but a lack of SDoH data collection systems has stymied this research. Private research organizations and governments have called upon industry to develop automated SDoH sensors reporting geo-localized, anonymized, pooled, shared environmental SDoH data to private and public SDoH databases.

While research organizations and governments wait for SDoH sensors to be deployed and SDoH databases to become online, the governments of the industrialized countries, lead by the WHO, have set regulatory guidelines for environmental noise, noise pollution, water quality, as well as indoor and outdoor air quality. Specifically addressing wind energy conversion systems, the WHO has set a maximum average noise exposure levels produced by wind turbines to below 45 dBA as wind turbine noise above this level is associated with adverse health effects.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The orders of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for multi-modal noise reduction for installation in a wind turbine, comprising:
   a hydrophobic sound absorbing fiber batting positioned in an interior of a monopole of the wind turbine;
   a fabric sheet hung vertically in the monopole, wherein the fabric sheet includes at least one turn;
   an isolation pad located between a base of the wind turbine and at least one of the monopole and a nacelle; and
   a rubber mat at the base of the wind turbine.

2. The system of claim 1, wherein the hydrophobic sound absorbing fiber is positioned segmentally along the interior of the monopole.

3. The system of claim 2, wherein the segmental positioning divides the monopole interior according to different frequency ranges.

4. The system of claim 1, wherein the sheet is a sail with a thickness within a range of one-eighth of an inch to one-fourth of an inch.

5. The system of claim 1, wherein the fabric sheet is a first sail of a plurality of sails, each sail being installed in the wind turbine and having at least one turn between a top and bottom of the sail.

6. The system of claim 1, wherein the isolation pad is screwed in with isolation washers on the screws.

7. The system of claim 1, wherein the rubber mat comprises a skirt that wraps around a bottom end of the monopole and occludes a gap where the bottom of the monopole connects to the base.

8. The system of claim 1, wherein the isolation pad is positioned between a top of the monopole and a bottom of the nacelle.

9. A method of multi-modal wind turbine noise reduction comprising:
   installing a hydrophobic sound absorbing fiber batting in an interior of a monopole of a wind turbine;
   hanging a fabric sheet vertically in the monopole, wherein the fabric sheet includes at least one turn;
   isolating a base from a nacelle of the wind turbine with a pad; and
   placing a rubber skirt at the base of the wind turbine.

10. The method of claim 9, wherein the hydrophobic sound absorbing fiber is positioned segmentally along the interior of the monopole.

11. The method of claim 10, wherein the segmental positioning divides the monopole interior according to different frequency ranges.

12. The method of claim 9, wherein the sheet is a sail with a thickness within a range of one-eighth of an inch to one-fourth of an inch.

13. The method of claim 9, wherein the fabric sheet is a first sail of a plurality of sails, each sail of the plurality being installed in the wind turbine and having at least one turn between a top and bottom of the sail.

14. The method of claim 9, wherein the isolation pad is screwed in with isolation washers on the screws.

15. The method of claim 9, wherein the rubber skirt wraps around a bottom end of the monopole and occludes a gap where the bottom of the monopole connects to the base.

16. The method of claim 9, wherein the isolation pad is positioned between a top of the monopole and a bottom of the nacelle.

17. A wind turbine, comprising:
   a nacelle;
   a base;
   a monopole mounted to the base and the nacelle, wherein the monopole includes an interior containing at least:
      a hydrophobic sound absorbing fiber batting; and
      a fabric sheet hung vertically in the monopole, the fabric sheet including at least one turn;
   an isolation pad located between the monopole and nacelle; and
   a skirt wrapped around the base.

18. The wind turbine of claim 17, wherein the hydrophobic sound absorbing fiber is positioned segmentally along the interior of the monopole.

19. The wind turbine of claim 18, wherein the segmental positioning divides the monopole interior according to different frequency ranges.

20. The wind turbine of claim 17, wherein the fabric sheet has a thickness within a range of one-eighth of an inch to one-fourth of an inch.

* * * * *